(12) United States Patent
Price et al.

(10) Patent No.: US 6,931,598 B2
(45) Date of Patent: Aug. 16, 2005

(54) DYNAMIC WEB LIST DISPLAY

(75) Inventors: Stephen H. Price, Lehi, UT (US); Tyler Packer, Pleasant Grove, UT (US); Michael G. Collins, Orem, UT (US); Jason V. Butterfield, Cedar Hills, UT (US)

(73) Assignee: Intel Corporation, Santa Clara, CA (US)

( * ) Notice: Subject to any disclaimer, the term of this patent is extended or adjusted under 35 U.S.C. 154(b) by 647 days.

(21) Appl. No.: 09/821,798

(22) Filed: Mar. 30, 2001

(65) Prior Publication Data

US 2002/0140729 A1 Oct. 3, 2002

(51) Int. Cl.$^7$ .............................. G06F 3/00; G06F 9/00; G06F 17/00
(52) U.S. Cl. ....................... 715/760; 715/744; 715/749; 715/765; 715/835; 715/840; 715/501.1; 715/513; 719/316
(58) Field of Search .............................. 715/501.1, 513, 715/514, 738, 744, 749, 760, 765, 810, 835, 840, 866, 511; 719/311, 313, 315, 316; 345/738, 744, 749, 760, 765, 810, 835, 840, 866; 707/203

(56) References Cited

U.S. PATENT DOCUMENTS

| | | | | |
|---|---|---|---|---|
| 5,920,867 A | * | 7/1999 | Van Huben et al. | 707/101 |
| 5,978,842 A | * | 11/1999 | Noble et al. | 709/218 |
| 6,339,772 B1 | * | 1/2002 | Klein et al. | 707/4 |
| 6,381,645 B1 | * | 4/2002 | Sassin | 709/227 |
| 6,415,316 B1 | * | 7/2002 | Van Der Meer | 709/203 |
| 6,493,742 B1 | * | 12/2002 | Holland et al. | 709/200 |
| 6,591,266 B1 | * | 7/2003 | Li et al. | 707/10 |
| 6,684,369 B1 | * | 1/2004 | Bernardo et al. | 715/513 |
| 6,785,721 B1 | * | 8/2004 | Immerman et al. | 709/220 |
| 2002/0054040 A1 | * | 5/2002 | Moshal et al. | 345/440 |
| 2002/0178187 A1 | * | 11/2002 | Rasmussen et al. | 707/513 |

FOREIGN PATENT DOCUMENTS

| | | | | |
|---|---|---|---|---|
| EP | 0883068 A2 | * | 12/1998 | G06F/17/30 |
| EP | 0977099 A1 | * | 2/2000 | G05B/19/042 |
| EP | 1132847 A2 | * | 9/2001 | G06F/17/60 |
| EP | 1215610 A2 | * | 6/2002 | G06F/17/60 |
| TW | 462010 A | * | 11/2001 | G06F/17/00 |
| WO | WO 02/071263 A2 | * | 9/2002 | G06F/17/30 |

OTHER PUBLICATIONS

Provisional U.S. Appl. No. 60/257,123, filed Dec. 20, 2000.*

Norvin Leach, "Distributed app developers get Visual Edge; COM, Java applications made easy with tools", May 5, 1997, PC Week, v14, n18, p25 (2).*

William R. Stanek, "Creativity and control", Jan. 20 1998, PC Magazine, v17, n2, p233 (5).*

Barb Cole, "Database companies begin rolling out slew of Web wares", Dec. 11, 1995, Network World, vol. 12, Iss. 50, p. 14 (1).*

Business Editors/High–Tech Writers, "Laszlo Systems Ships Enterprise–Class Laszlo Presentation Server", Jun. 9, 2003, Business Wire, p. 1.*

* cited by examiner

*Primary Examiner*—X. L. Bautista
(74) *Attorney, Agent, or Firm*—Pillsbury Winthrop Shaw Pittman LLP

(57) ABSTRACT

An arrangement is provided for dynamic web list display. A view page is displayed at a client site. The view page hosts a plug-in and supplies the plug-in a link to a filler page on a server. The filler page provides list content with specified content structure. The plug-in downloads the filler page from the server site and renders the list content according to the content structure specified by the filler page.

32 Claims, 10 Drawing Sheets

DYNAMIC WEB LIST DISPLAY

RESERVATION OF COPYRIGHT

This patent document contains information subject to copyright protection. The copyright owner has no objection to the facsimile reproduction by anyone of the patent document or the patent, as it appears in the U.S. Patent and Trademark Office files or records but otherwise reserves all copyright rights whatsoever.

BACKGROUND

Aspects of the present invention relate to World Wide Web. Other aspects of the present invention relate to displaying content in a web browser.

World Wide Web has offered, since its creation, an effective means to share information. Information can be stored at a web server and can be located via a Uniform Resource Locator (URL) address. Information stored at any web server that is identifiable with a URL address can be accessed or retrieved via a web browser. Such a web browser is essentially an engine running on the World Wide Web with the capability of connecting to a web server identifiable with a URL address, receiving information from the web server, and rendering received information in a Graphical User Interface (GUI). With a web browser, information across the globe is simply one click away.

To facilitate web browsing, information stored on a web server is organized into web pages. A web page is essentially an electronic document that ties different pieces of information together on a single screen page. Such document may be a conventional text document or a multimedia document that incorporates information of different media such as text, audio, and visual information. Web pages are often constructed using some agreed protocols or languages. Such languages include HyperText Markup Language (HTML) and eXtensible Markup Language (XML). Using such languages, different pieces of information may be tied together in flexible ways to form a single web page. For example, HTML provides the capability of tagging different piece of information. It also provides the capability to visually arrange different pieces of information. For instance, a company logo (which may be an image icon) may be specified in an HTML document to be placed at the upper left corner of a web page with certain offset margins from the top and the left sides of the page.

Conventionally, when a web browser downloads information from a web server, it downloads web pages. The smallest unit of downloading corresponds to an entire web page. Once a web page is downloaded, the browser simply displays what is in the web page. That is, the web browser does not have the authority to manipulate a web page. For example, a web browser downloads and displays a web page containing a list of stock information. The list of stocks is sorted according to the alphabetic order of the stock symbols and each line in the list corresponds to a single stock (e.g., the stock symbol, its current price, its highest price in 52 weeks, its lowest price in 52 weeks, etc.). The web browser can not re-arrange the list in the web page (e.g., sort the stocks in an descending order of its current price). Neither can a user change the feel and look of the web page. In addition, a user can not select some of the stocks from the list to, for example, print or generate a customized stock information list.

A different aspect associated with current web browsing is that a web browser can not dynamically update part of a web page that has been changed since it is downloaded. When the content of a web page is updated, it is updated at the web server where the web page is stored. The update (no matter how small it is) yields an entire new web page. Any update to a displayed web page in a browser can only be achieved by downloading the entire new web page and re-display it. When there is only minor changes to a web page, the bandwidth used to download the entire new web page is not effectively used.

BRIEF DESCRIPTION OF THE DRAWINGS

The present invention is further described in terms of exemplary embodiments which will be described in detail with reference to the drawings. These embodiments are non-limiting exemplary embodiments, in which like reference numerals represent similar parts throughout the several views of the drawings, and wherein.

DETAILED DESCRIPTION

Figure 1:
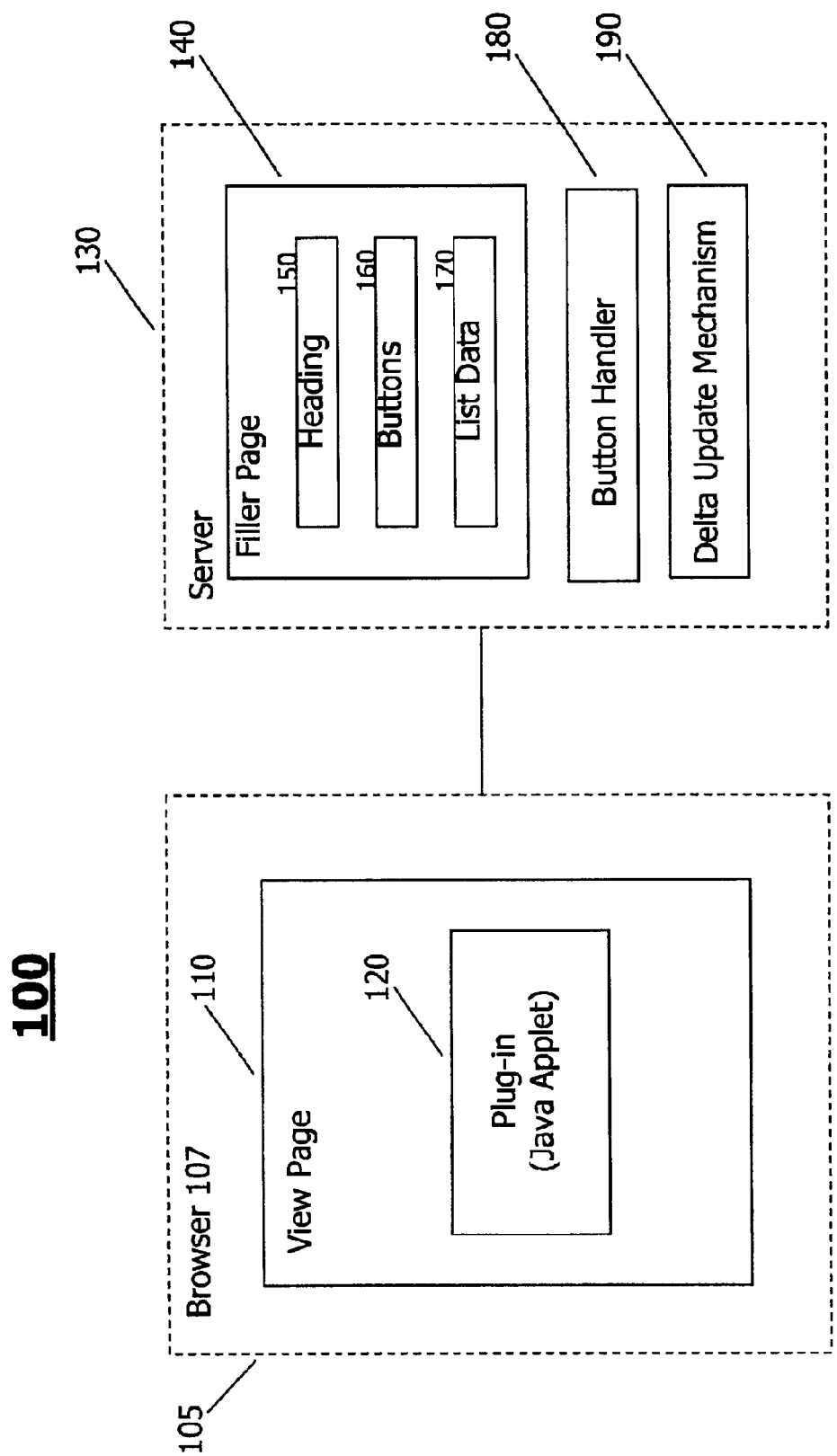
FIG. 1 depicts the high level architecture of the embodiments of the present invention.

A high level architecture of embodiments of the present invention and of the environment in which the present invention operates in shown in FIG. 1. System 100 in FIG. 1 comprises a view page 110, a filler page 140, zero or more button handler 180, and a delta update handler190. The view page 110 hosts a plug-in 120 and is displayed in a browser 107 at a client site 105. The filler page 140, the button handler 180, and the delta update handler 190 reside on a server 130. The filler page 140 includes a heading 150, zero or more buttons 160, and a list data 170. The plug-in 120 may be implemented in different forms. For example, the plug-in 120 may be realized as a Java applet or as an ActiveX control. In the following description, a Java applet is used as an exemplary plug-in. It should be appreciated that the use of a Java applet herein is illustrative and not restrictive.

The system 100 facilitates the dynamic display of list content in the browser 107. The Java applet 120 downloads the filler page 140 with list content (the list data 170) and content structure specifications (heading 150) and renders the list data accordingly. The system 100 also facilitates operations to be performed on the list content displayed according to the buttons 160 defined in the filler page 140 and the button handler 180. List content may also be regularly or dynamically updated. Delta changes to the list content may be tracked and adaptively rendered through the Java applet 120 and the delta update handler190.

The view page 110 may correspond to a web page that can be invoked from the browser 107. For example, a web page represented by the view page 110 is displayed in the browser when a link to the web page is clicked or when a user enters the Uniform Resource Locator (URL) address of the web page in the browser 107. In FIG. 1, the view page 110 hosts the Java applet 120. The view page 110 may host the Java applet 120 via the use of <APPLET></APPLET> tags in HyperText Markup Language (HTML). The view page 110 may also supply the Java applet 120 with parameters, by using, for example, the <PARAM></PARAM> tags of HTML, to control the operations to be performed by the Java applet 120. For example, the view page 110 may provide the Java applet 120 a Uniform Resource Locator (URL) address to the filler page 140 so that the filler page 140 can be downloaded from the server where the filler page 140 resides. The view page 110 may also supply parameters such as the frequency at which the list content is to be updated.

The filler page 140 specifies list data, the structure of the list data, and the operations to be performed on the list data. List data may be in the form of a plurality of data tuples, each of which includes a plurality of attributes. Different data tuples are arranged in different rows. The structure of such list data may be defined according to the composition of data tuples and the relative positions of their attributes. In the system 100, such structure is specified in the heading 150, which may define a set of attributes in a particular order.

Figure 2:
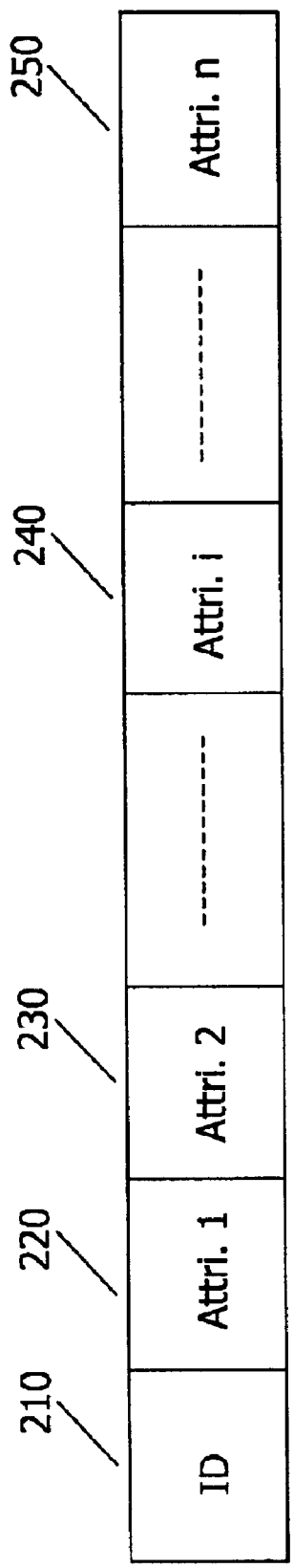
FIG. 2 is an exemplary construct of a heading.

FIG. 2 is an exemplary construct of the heading 150. In FIG. 2, heading 150 includes an identification 210, which may be used to uniquely identify each data tuple, and a list of attributes 220, 230, . . . , 240, . . . , 250. Each of the attributes defines a single column in the data list and the list of attributes together defines the structure of the list data.

Figure 3:
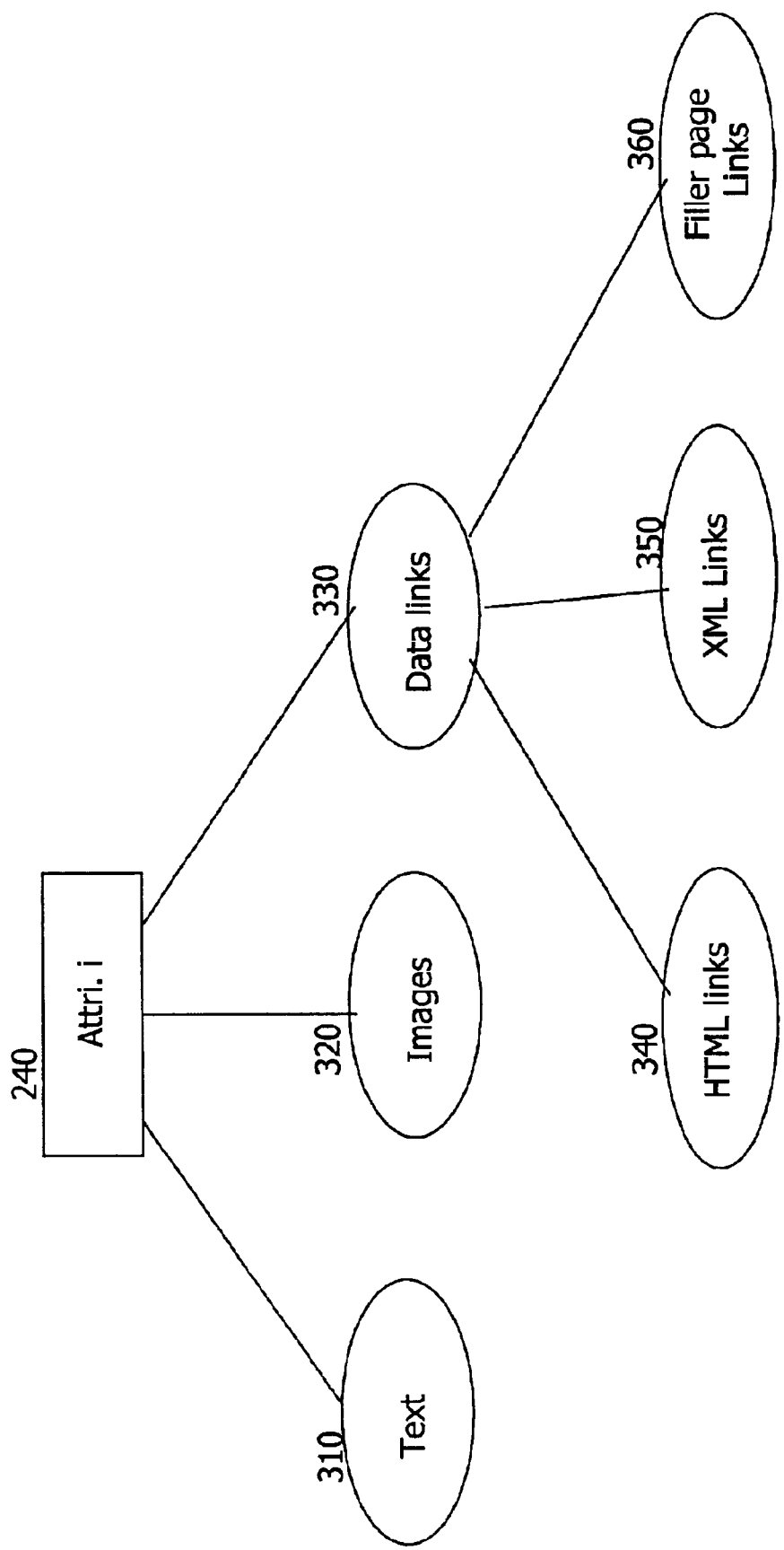
FIG. 3 illustrates exemplary types of attributes for a column of list content.

An attribute defined in the heading 150 may correspond to different types of data. FIG. 3 illustrates exemplary types of attribute. An attribute (e.g., 240) may define a text data type 310 such as a text string or a numeric string. An attribute may define an image data type 320. An image attribute may correspond to a structure which defines an image and its associated properties such as dimensions and color scheme used. Furthermore, an attribute may also define a data link type 330. A data link may be an HTML document link 340, an XML document link 350, or a filler page link 360. The Java applet 120 may display a different list data by following a filler page link in the list data.

The list data 170 in FIG. 1 represents the list content that is structured according to the heading 150. That is, the list data 170 may comprise a plurality of data tuples, each of which may have a plurality of attributes appearing in the order specified by the heading 150. Various operations may be performed on the list data 170. For example, data tuples in different rows may be re-ordered according to some sorting criterion applied to a particular attribute. As another example, a user may request to delete some data tuples in the list data 170.

The list data 170 may be manipulated via a plurality of buttons 160. Buttons 160 provide the means to activate corresponding operations. Each button may be associated with a single operation or a plurality of operations. An operation may be invoked when the associated button is clicked. The execution of an invoked operation may be realized through a link, associated with the button, to an URL address where a button handler (discussed later) that performs the operation resides. An exemplary construct of a button definition is shown in FIG. 4.

Figure 4:
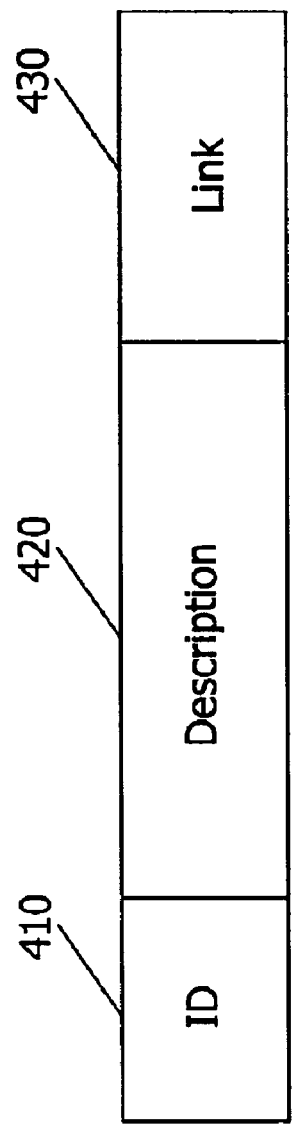
FIG. 4 is an exemplary construct of a button definition.

In FIG. 4, a button defined in the filler page 140 may be specified according to an identification 410, a description 420, and a link 430. The identification 410 may be used as a unique identifier of the button. The description 420 may correspond to a textual specification about the corresponding operation associated with the underlying button. For example, description "delete" indicates that the underlying button, once clicked, performs a deletion operation on the list data.

The link 430 in FIG. 4 is provided to connect the underlying button with the method or function that performs the operation associated with the button. For example, a button for "sorting" operation may be linked, via the link 430, to a remote function stored at the server site 130 so that whenever the button "sorting" is clicked, the remote function is invoked to perform the sorting operation.

In the system 100 shown in FIG. 1, the Java applet 120 understands the construct of the filler page 140 and renders or displays the list data from the filler page in a rendering window based on the content structure specified in the filler page 140. When the view page 110 is loaded by the browser 107, it supplies an URL address of the filler page 140 to the Java applet 120. Using the URL address for the filler page 140, the Java applet 120 downloads the filler page 140.

Once the filler page 140 is downloaded, the Java applet 120 decodes the information contained in the filler page 140 and renders the list data accordingly. For example, the list data 170 may be displayed in a window with appropriate headings (according to the heading 150). The buttons (according to 160) are rendered in the same window to provide visual means for a user to manipulate the list data via simply clicks on the buttons.

The corresponding functions that perform the operations associated with the buttons may reside at either the client site 105 or the server site 130. That is, the operations on the list data may be performed locally (at the client site) or remotely (at the server site). The button handler 180 in FIG. 1 performs operations on the list data 170 from the server 130. Operations on the list data 170 may also be performed at the client site. This will be discussed in referring to FIG. 5.

After the list data 170 is rendered or displayed, the content of some data tuples may change over time. In FIG. 1, the Java applet 120 dynamically re-renders or updates the data tuples that are changing over time at the client site. This is achieved via the cooperation between the Java applet 120 and a delta update handler190 at the server site.

Figure 5:
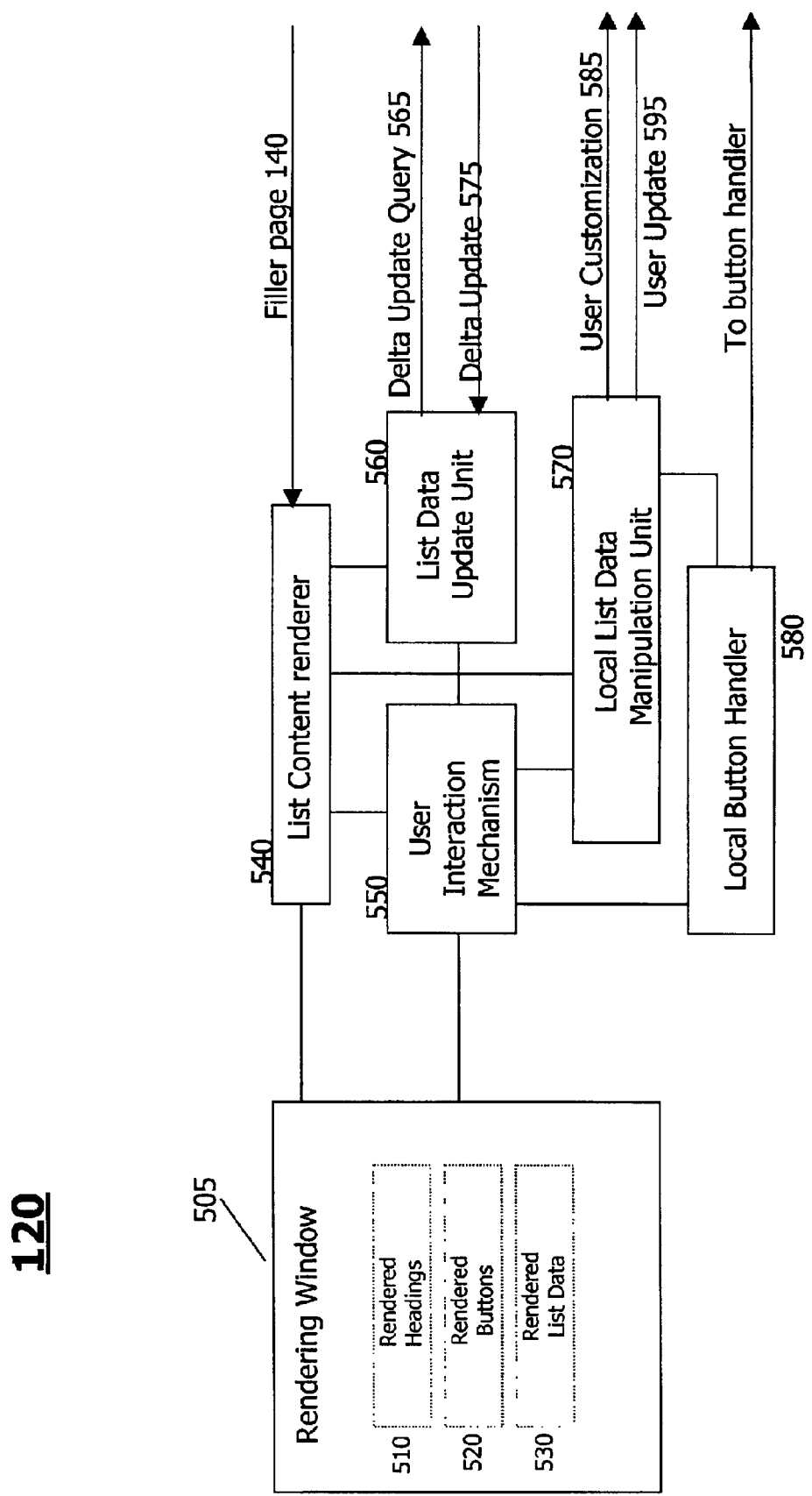
FIG. 5 depicts the internal structure of a Java applet in relation to a view page.

FIG. 5 depicts the internal structure of the Java applet 120. In FIG. 5, the Java applet 120 comprises a rendering window 505, a list content renderer 540, a user interaction mechanism 550, a local button handler 580, a local list data manipulation unit 570, and a list data update unit 560. The list content renderer 540 downloads the filler page 140 from the server 130 and renders the list content in the rendering window 505 according to the filler page 140. The list content rendered in the rendering window 505 includes a rendered heading 510, rendered buttons 520, and a rendered list data 530.

The interaction mechanism 550 conducts interactions between the Java applet 120 and a user of the browser. Examples of such interactions include scrolling up and down the list data in the rendering window 505 or clicking on the rendered buttons. Interactions from a user usually correspond user's requests. Depending on the interaction, the user interaction mechanism 550 may activate different components in the Java applet to react to the user's requests. For example, when a user uses a mouse to scroll down in the rendering window, the list data displayed may need to be updated. When a button is clicked, the user interaction mechanism 550 may inform the local button handler 580. When a user requests to check whether some of the list data has been changed (e.g., stock prices), the user interaction mechanism 550 may trigger the list data update unit 560 to identify the delta changes on the list data.

The local button handler 580 may be notified of any request corresponding to button interactions. That is, whenever a user clicks a rendered button 520, the local button handler 580 is notified that the corresponding operation is selected. In the exemplary embodiment of the present invention shown in FIG. 5, the local button handler 580 may either perform certain operations locally at the client site or may dispatch some operation requests to the button handler 180 at the server site. The operations to be performed locally may be supported by the local list data manipulation unit 570.

The local list data manipulation unit 570 performs operations on the list data 170 based on user's requests that are issued via the user interaction mechanism 550. For example, if a user selects (e.g., by highlighting) a particular attribute in the list data and requests the list data to be sorted according to the ascending order of the selected attribute values, the local list data manipulation unit 570 may first perform the sorting on the list data based on the selected attribute and then request the list content renderer 540 to re-render the list content based on the sorted list data.

The local list data manipulation unit 570 may also facilitate the local button handler 580 to perform certain operations that users request by clicking the rendered buttons 520. For example, if a user desires to generate a customized list based on the rendered list data 530, the user may highlight unwanted data tuples in the rendered list data and click on a "delete" button (one of the rendered buttons 520). In this case, the user interaction mechanism 550 informs the local button handler the desired operation (to delete highlighted data tuples). The local button handler 580 may recognize that it is a local customization operation (not a permanent deletion of the data tuples in the filler page) and decide to handle it locally. In this case, the local button handler 580 requests the local list data manipulation unit 570 to generate a different copy of the list data with the highlighted data tuples removed. The new copy of the list data, generated by the local list data manipulation unit 570, may be sent to the list content renderer 540 so that the customized list data may be rendered. The new copy of the list data may also be sent back, as user customization 585, to the server to be stored as, for example, a different filler page or a customization of the original filler page. Any changes made to the list data at the client site (e.g., deletion of update) may also be sent back, as user update 595, to the server to update the filler page.

The list data update unit 560 keeps track of dynamic changes of the list data 170 and makes sure that the rendered list data 530 in the view page 110 is consistent with the dynamic list data 170. The list data update unit 560 may keep track of such changes regularly based on a timer or it may be triggered by a user through the interaction (e.g., click a rendered button). The list data update unit 560 may perform update in different modes of operation. For example, it may perform a full update. In this case, it may simply trigger the list content renderer to re-load the filler page 140 from the server and re-render the list content in the rendering window. The list data update unit 560 may also perform a delta update. In this case, only the list data items that are changed are to be updated or re-rendered.

When the list data update unit 560 is activated to perform delta update, it generates a delta update query 565 and sends the query to the delta update handler 190 (FIG. 1) at the server site. The query may be constructed based on a timestamp. The timestamp may be associated with the list data 170 and may be determined as the time the list data 170 is last updated or downloaded. Such a timestamp may be sent along from the server with the filler page 140 when the filler page is downloaded.

The delta update handler190, upon receiving the delta update query 565, examines whether any data tuple in the list data 170 (at the server site 130) has been updated since the given timestamp. When such update is identified, the delta update handler190 sends a delta update 575 back to the list data update unit 560. In this case, the list data update unit 560 activates the list content renderer 540 to render the delta changes in the rendering window 505 so that the delta updates to the list data 170 may be consistently reflected in the rendered list data 530.

Figure 6:
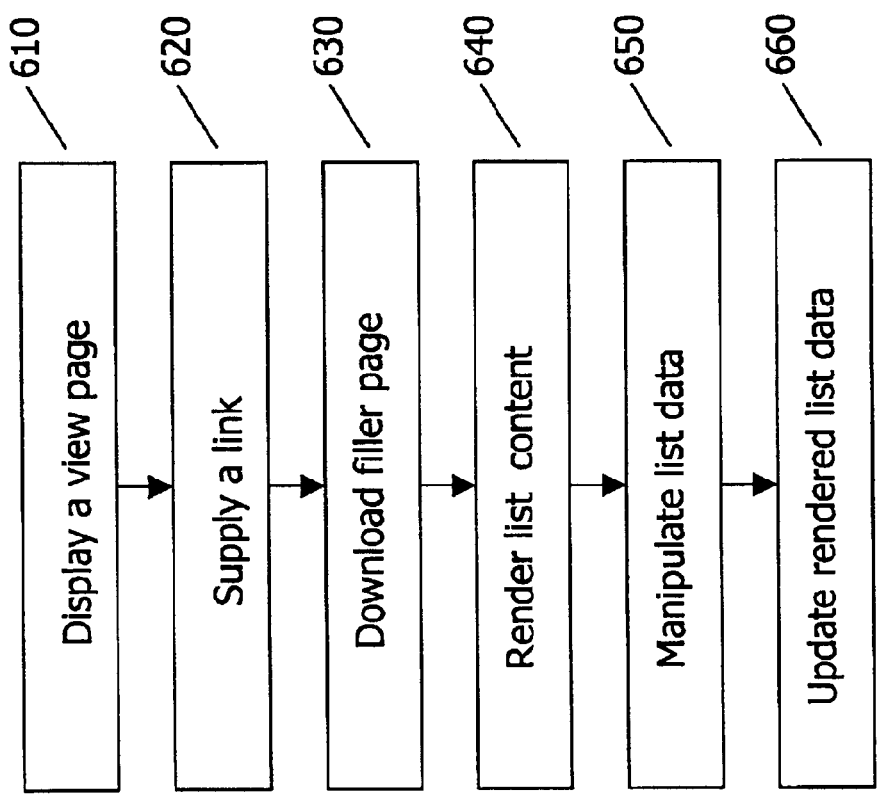
FIG. 6 is an exemplary flowchart for dynamic web list display.

FIG. 6 is an exemplary flowchart for system 100 that performs dynamic web list display. A view page is first displayed, at act 610, in a browser at a client site. The view page supplies a URL address, at act 620, to its hosted plug-in (e.g., a Java applet). Based on the URL address, the Java applet downloads, at act 630, a filler page that includes the information about the structure of a list content, the operations that can be performed on the list content, as well as the list data itself. Based on the filler page, the Java applet renders, at act 640, the list content in the rendering window. The rendered list content includes rendered heading, rendered list data, and rendered buttons. The list data may then be manipulated at act 650. List content is also updated, either regularly or dynamically, at act 660. The update performed at act 660 may include both full update and delta update.

Figure 7:
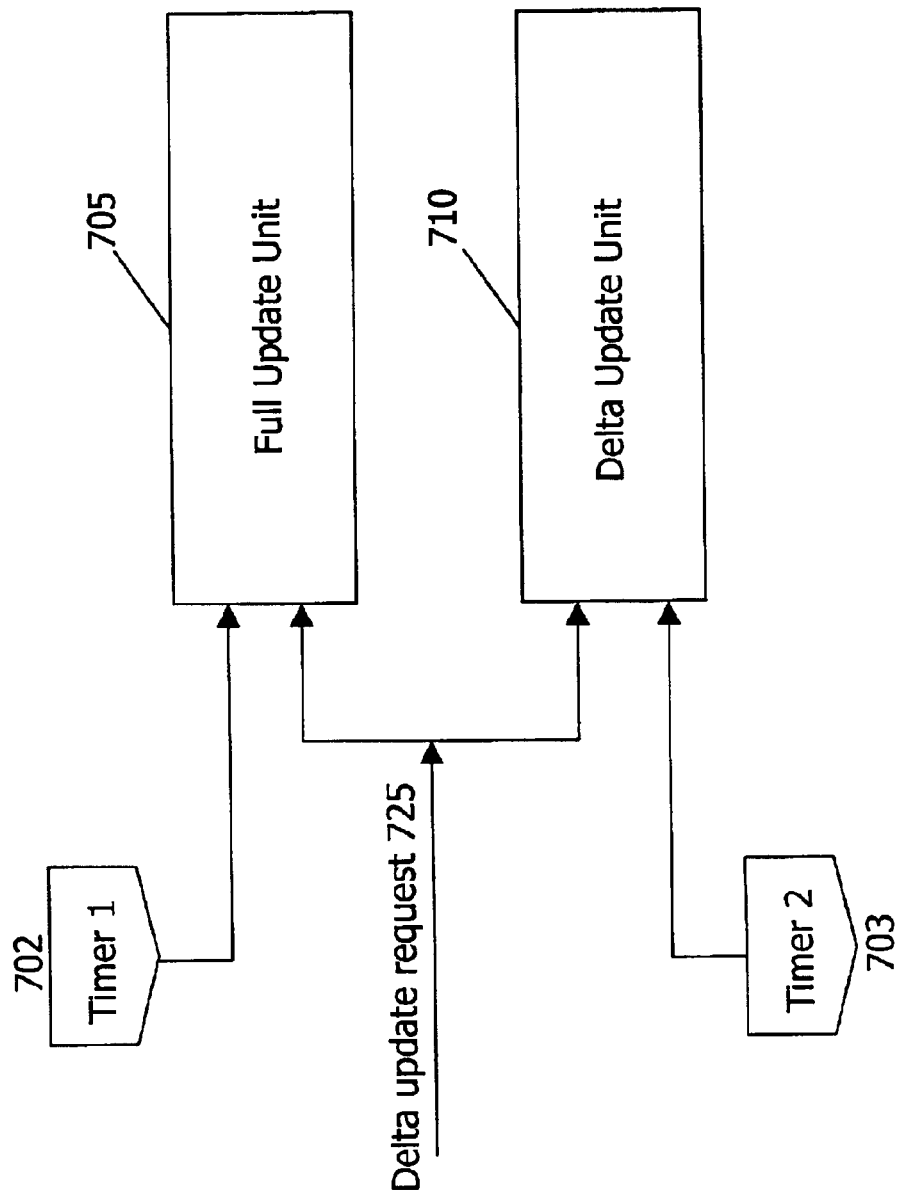
FIG. 7 shows the high level block diagram of a list data update unit.

FIG. 7 shows the high level construct of the list data update unit 560, which comprises a full update unit 705 and a delta update unit 710. The full update unit 705 performs full update either at a regular basis, controlled by a timer 1, 702, or dynamically, triggered by a update request 725 sent from the user interaction mechanism 550. The delta update unit 710 performs delta update. The delta update is triggered either by a timer 2, 703, at a regular basis or is activated by the update request 725. The timers 702 and 703 may be controlled through the parameters provided to the Java applet 120 by the view page 110.

The full update unit 705, when activated, may simply trigger the list content renderer 540 to re-load the filler page and re-render the entire list content according to the newly downloaded filler page. When delta update is triggered, the Java applet 120 collaborates with the delta update handler 190 at the server site to identify the delta changes and then to render the delta changes at the client site. When the delta changes represent a small portion of the entire list data 170, a smaller bandwidth is used to transmit the delta changes to the client site.

Figure 8:
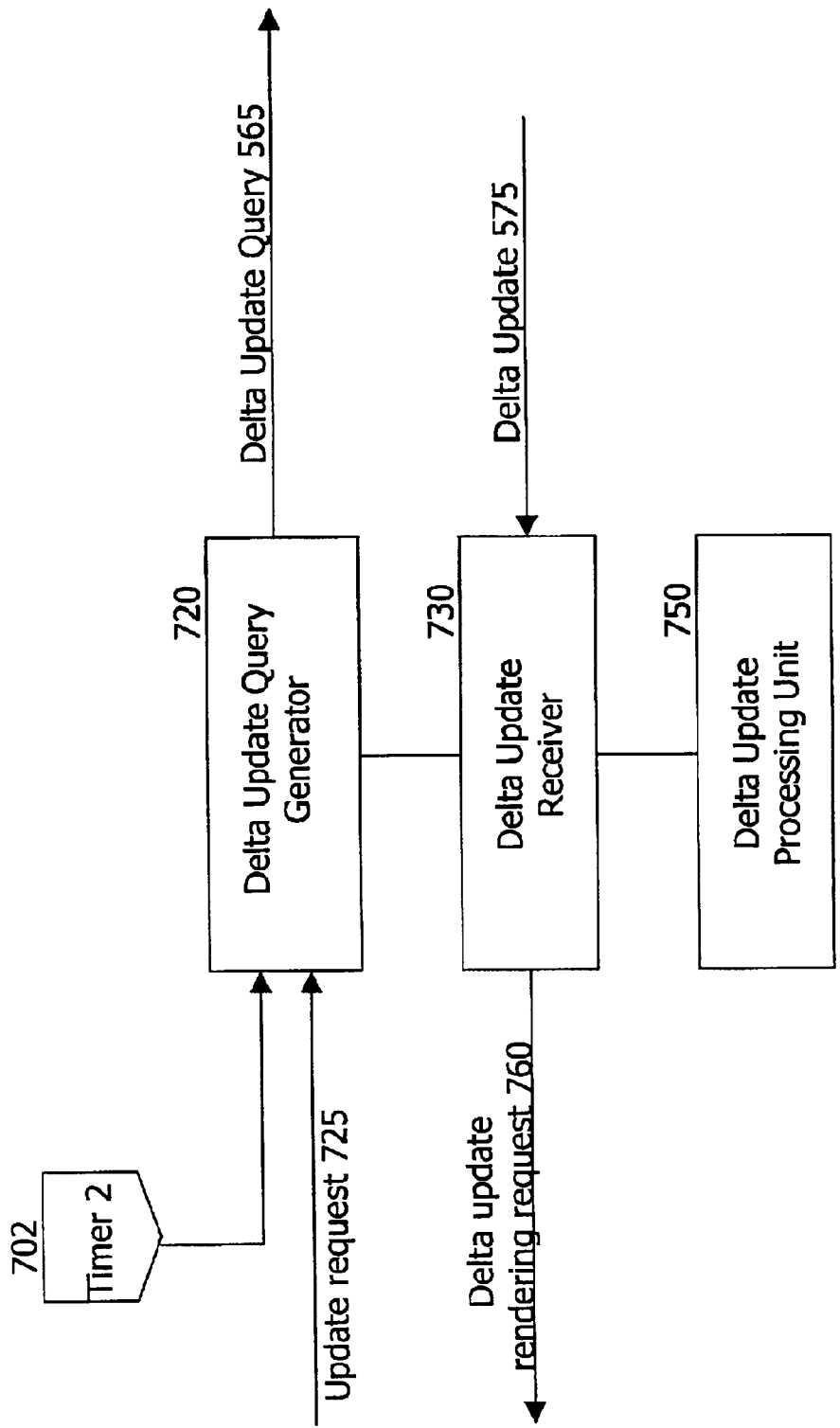
FIG. 8 depicts the internal structure of a delta update unit.

FIG. 8 depicts an exemplary internal structure of the delta update unit 710, in relation to the timer 703. In FIG. 8, the delta update unit 710 comprises a delta update query generator 720, a delta update receiver 730, and a delta update processing unit 750. The delta update query generator 720 constructs the delta update query 565 and sends the delta update query 565 to the delta update handler190. The delta update query 565 may be constructed based on various components, including a timestamp that may be associated with the time when the filler page 140 is most recently updated or downloaded from the server 130. The timestamp may serve as a reference point to instruct the delta update handler190 to identify any delta changes of the list data 170 occurred after the reference point.

The delta update query generator 720 (or the delta update unit 710) may be activated via different means. It may be activated regularly by the timer 703. It may also be triggered dynamically by a update request 725, generated by the user interaction mechanism 550 based on, for example, a user's request. For instance, a user may request to update the stock prices on a list of stocks. The delta update unit 710, in this case, sends a query to the delta update handler190 to identify the delta changes and performs the update only on the stock prices that have changed since the last time the stock prices are rendered.

The delta update 575, sent from the delta update handler190, includes both the delta changes to the list data 170, determined based on the timestamp included in the delta update query 565, and a new timestamp. The delta update receiver 730 receives the delta update 575 and sends a delta update rendering request 740 (if any delta change is identified) to the list content renderer 540. In addition, the new timestamp is processed by the delta update processing unit 750 so that the timestamp used in constructing the delta update query 565 (associated with the filler page 140 when it is last time downloaded) is also updated with the new timestamp.

Figure 9:
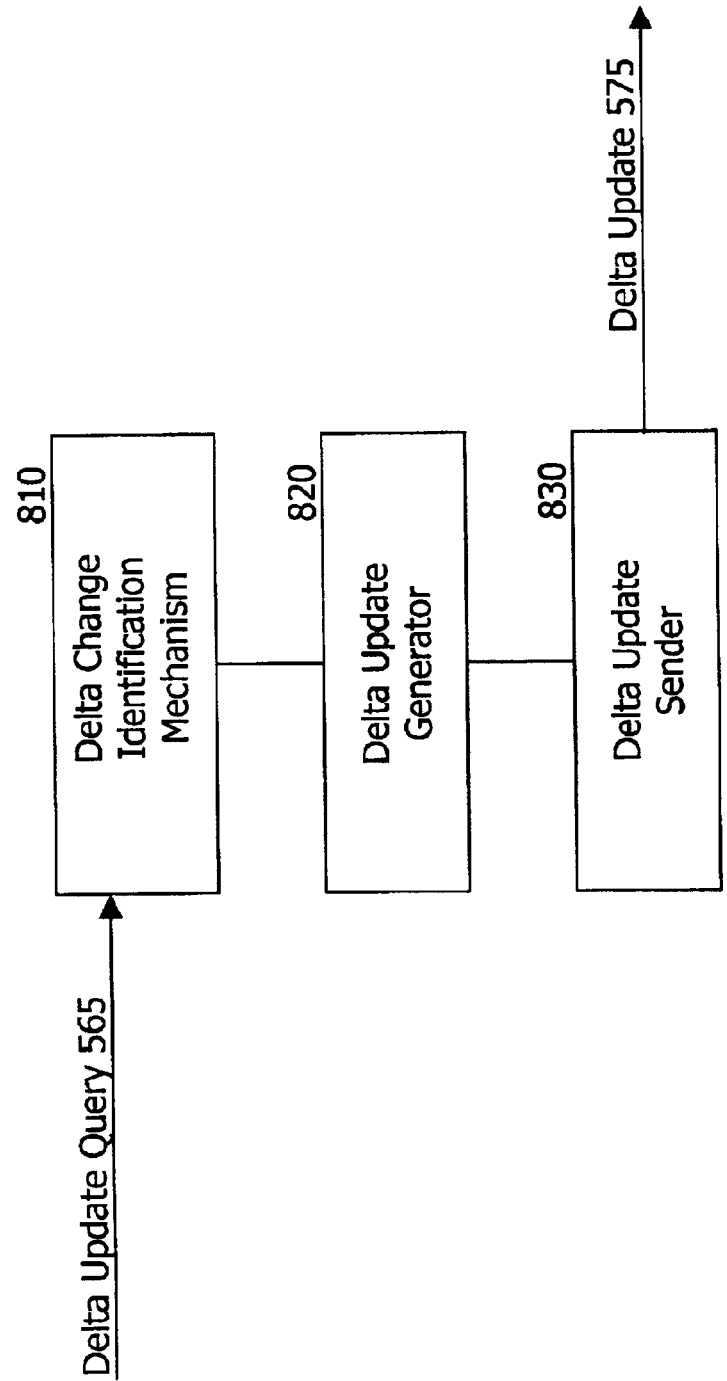
FIG. 9 shows the high level block diagram of a delta update handler.

FIG. 9 shows the high level block diagram of the delta update handler190, which comprises a delta change identification mechanism 810, a delta update generator 820, and a delta update sender 830. The delta change identification mechanism 810 takes the delta update query 565 as input, which includes a timestamp serving as a reference point, and identifies the data tuples in the list data 170 that have been updated after the given reference point.

When at least one data tuple has been updated after the reference point, delta update has occurred. In this case, the delta update generator 820 constructs a return message or the delta update 575, which may include a list of updated data tuples and a new timestamp. The new timestamp may be derived based on the time when the delta update 575 is constructed. It may also be determined based on the time at which the latest update to the data tuple was made. The new timestamp is to provide a new reference point to the list data update unit 560 so that next delta update query 565 can be constructed based on an updated timestamp. The delta update sender 830 transmits the delta update 575 to the delta update receiver 730 (FIG. 8).

Figure 10:
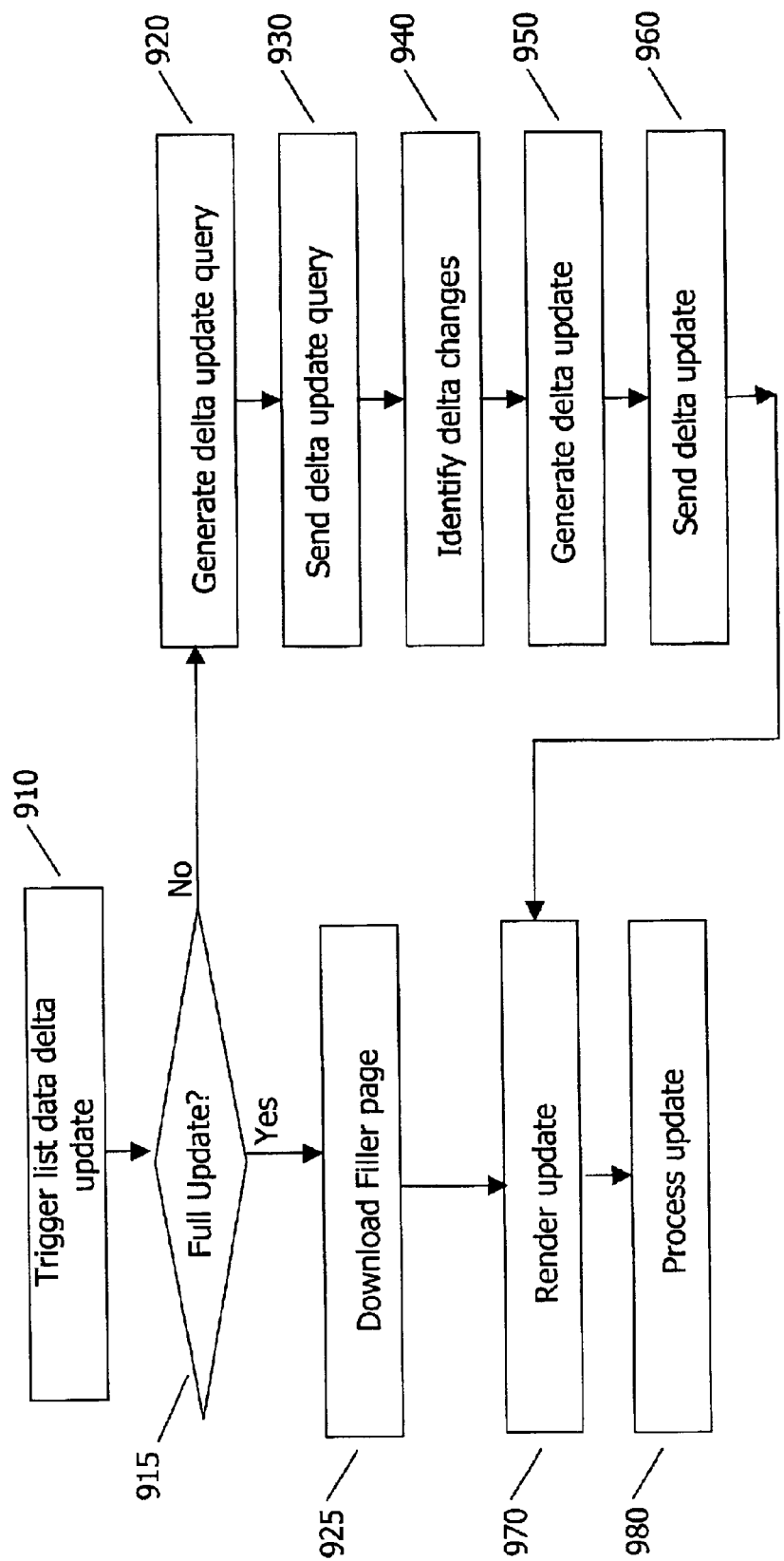
FIG. 10 is an exemplary flowchart of a process, which performs list content update.

FIG. 10 is an exemplary flowchart of a process, which performs list content update. The list data update unit 560 is first triggered or activated, at act 910. The activation may be controlled by some timer (e.g., timer 702 or timer 703) that regulates the update or may be triggered by a user via user interaction mechanism 550. Upon the triggering, the list data update unit 560 determines, at act 915, whether a full update or a delta update, is to be performed. When a full update is to be performed, the filler page is downloaded at act 925. A timestamp may be downloaded with the filler page. The updated filler page is rendered at act 970 and the timestamp sent together with the filler page is processed at act 980.

When a delta update is to be performed, determined at act 915, the delta update unit is activated. In this case, a delta update query 565 is generated, at act 920, based on a timestamp associated with the previously downloaded filler page. The constructed delta update query is sent, at act 930, from the client site to the delta update handler190 at the server site.

Based on the delta update query 565, the delta update handler190 identifies, at act 940, the updates made to the data tuples in the list data 170 after the given timestamp. The identified updates are used to generate, at act 950, a delta update 575 with a new timestamp. The delta update 575 is then sent, at act 960, back to the list data update unit 560 at the client site. Based on the delta update 575, the rendered list data 530 in the rendering window 505 is updated, at act 970, that renders only the portion of the rendered list data or data tuples that have been changed. The delta update 575 is then further processed, at act 980, so that the new timestamp is used to replace the previous timestamp.

The processing described above may be performed by a general-purpose computer alone or in connection with a special purpose computer. Such processing may be performed by a single platform or by a distributed processing platform. In addition, such processing and functionality can be implemented in the form of special purpose hardware or in the form of software being run by a general-purpose computer. Any data handled in such processing or created as a result of such processing can be stored in any memory as is conventional in the art. By way of example, such data may be stored in a temporary memory, such as in the RAM of a given computer system or subsystem. In addition, or in the alternative, such data may be stored in longer-term storage devices, for example, magnetic disks, rewritable optical disks, and so on. For purposes of the disclosure herein, a computer-readable media may comprise any form of data storage mechanism, including such existing memory technologies as well as hardware or circuit representations of such structures and of such data.

While the invention has been described with reference to the certain illustrated embodiments, the words that have been used herein are words of description, rather than words of limitation. Changes may be made, within the purview of the appended claims, without departing from the scope and spirit of the invention in its aspects. Although the invention has been described herein with reference to particular structures, acts, and materials, the invention is not to be limited to the particulars disclosed, but rather extends to all equivalent structures, acts, and, materials, such as are within the scope of the appended claims.

What is claimed is:

1. A method, comprising:
    displaying, at a client site, a view page which hosts a plug-in;
    supplying, by said view page, a link to said plug-in, said link pointing to a filler page on a server, said filler page providing a list data having a plurality of data tuples, each of the plurality of data tuples including a plurality of attributes, the plurality of data tuples being displayed in horizontal rows and the plurality of attributes being displayed in vertical columns;
    downloading, by said plug-in from said server site, said filler page; and
    rendering, by the plug-in at said client site, said list data.

2. The method according to claim 1, wherein said plug-in includes a Java applet.

3. The method according to claim 1, wherein said plug-in includes an ActiveX control.

4. The method according to claim 1, wherein said filler page comprises:
    a heading specifying a sequence of the plurality of attributes in vertical columns and specifying a sequence of the plurality of data tuples in horizontal rows.

5. The method according to claim 4, wherein the plurality of attributes defines at least one of:
    an identification that uniquely identifies each of said at least one data tuple;

a text string;

an image; or a data link.

6. The method according to claim 5, wherein said data link includes a HTML link.

7. The method according to claim 5, wherein said data link includes a link to a filler page.

8. The method according to claim 4, further comprising:

one or more buttons, each of said one or more buttons being used to invoke a corresponding operation to be performed on said list data.

9. The method according to claim 8, wherein each of said one or more button comprises:

an identification that uniquely identifies a button;

a description associated with said button to describe the operation to be performed when said button is clicked; and a link pointing to a corresponding button handler that performs said operation associated with said button on said list data.

10. The method according to claim 8, wherein said rendering by said plug-in comprises:

rendering said heading according to said sequence of the plurality of attributes;

rendering said plurality of data tuples according to an order defined by said sequence of the plurality of attributes; and rendering said one or more buttons, each of said one or more buttons being implemented according to said link to said associated button handler that performs said corresponding operation when said one or more buttons is clicked.

11. The method according to claim 8, further comprising:

changing said sequence of the plurality of data tuples by clicking at least one of the one or more buttons; and updating said list data.

12. The method according to claim 11, wherein said updating comprises:

triggering a list data update unit in said plug-in;

determining a mode of updating, said mode of updating including a full update or a delta update;

downloading, if the mode of updating corresponding to full update, the filler page from the server site, the downloaded filler page corresponding to a new timestamp and representing a full update;

rendering the full update;

generating, if the mode of updating is a delta update, by a delta update unit, a delta update query, based on a timestamp associated with said list data;

sending said delta update query to a delta update handler at said server site;

identifying, by said delta update handler, delta changes based on said timestamp specified in said delta update query;

generating a delta update based on said delta changes using a second new timestamp;

sending said delta update with said second new timestamp to said delta update unit;

rendering the delta update; and processing said new timestamp and said second new timestamp to replace said timestamp.

13. The method of claim 11, wherein said changing of said sequence of the plurality of data tuples includes deleting at least one of said data tuples from said data list.

14. The method of claim 11, wherein said changing of said sequence of the plurality of data tuples includes rearranging the order of said plurality of data tuples according to a characteristic of one of the plurality of attributes.

15. A system, comprising:

a view page at a client site, said view page hosting a plug-in for displaying and manipulating list content;

a filler page, hosted on a server, for providing list data, associated heading specifying the content structure of said list data, and one or more buttons each of which facilitate an operation on said list data, said list data including a plurality of distinct data tuples and a plurality of attributes relating to each of the plurality of distinct data tuples, each distinct data tuple being displayed in a single horizontal row and each of the plurality of attributes being displayed in a vertical column within the horizontal row, said plurality of data tuples and plurality of attributes being sequenced in an order according to said heading; and one or more button handlers on said server site for facilitating said operation on said list data, each of said one or more button handlers corresponding to one of said one or more buttons specified in said filler page.

16. The system according to claim 15, further comprising:

a delta update handler located on said server, for performing operations related to updates performed on said list data.

17. The system according to claim 16, wherein said delta update handler comprises:

a delta change identification mechanism for identifying changes made to at least one of said plurality of data tuples in said list data since a time specified by a timestamp;

a delta update generator for generating a delta update containing a set of data tuples that have been updated since said time; and a delta update sender to send said delta update to said plug-in.

18. The system according to claim 17, wherein said plug-in includes a Java applet.

19. The system according to claim 17, wherein said plug-in comprises:

a list content renderer for rendering said list data according to said heading, said one or more button, and said delta update; and a user interaction mechanism for conducting interactions on said list data, said interactions activating manipulations to be performed on said list data via said one or more buttons.

20. The system according to claim 19, further comprising:

one or more local button handlers for facilitating some of said manipulations to be performed at said client site on said list data and for dispatching some of said manipulations to said one or more button handlers located at said server site; and a local list data manipulation unit for supporting said manipulations to be performed at said client site.

21. The system according to claim 20, further comprising:

a list data update unit for updating the plurality of data tuples in said list data that have been manipulated.

22. The system according to claim 21, wherein said list data update unit comprises:

a full update unit for performing a full update on said list data; and a delta update unit for performing a delta update on said list data.

23. The system according to claim 22, further comprising:

a first timer for regulating the frequency of the full update performed by the full update unit; and a second timer for regulating the frequency of the delta update performed by the delta update unit.

24. The system according to claim 22, wherein said delta update unit comprises:

a delta update query generator for generating a delta update query based on said timestamp to inquiry about the delta changes made to said list data, said delta update query being sent to said delta update handler;

a delta update receiver for receiving said delta update generated by said delta update handler with said new timestamp and for initiating a delta update rendering request to said list content renderer based on said delta update; and a delta update processing unit for processing said delta update to update said timestamp with said new timestamp.

25. A computer-readable medium having program code stored therein for causing, when executed, a dynamic web list display to occur, comprising displaying, at a client site, a view page which hosts a plug-in;

supplying, by said view page, a link to said plug-in, said link pointing to a filler page on a server, said filler page providing a list data having a plurality of data tuples and each of the plurality of data tuples including a plurality of attributes, wherein the plurality of data tuples are displayed in horizontal rows and the plurality of attributes are displayed in vertical columns;

downloading, by said plug-in from said server site, said filler page; and rendering, by the plug-in at said client site, said list data.

26. The medium according to claim 25, wherein said filler page comprises:

a heading specifying a sequence of the plurality of attributes in vertical columns and specifying a sequence of the plurality of data tuples in horizontal rows.

27. The medium according to claim 26, the dynamic web list display further comprising:

one or more buttons, each of said one or more buttons being used to invoke a corresponding operation to be performed on said list data.

28. The medium according to claim 25, wherein said rendering by said plug-in comprises:

rendering said heading according to said sequence of the plurality of attributes;

rendering said plurality of data tuples according to an order defined by said sequence of the plurality of attributes; and rendering said one or more buttons, each of said one or more buttons being implemented according to said link to said associated button handler that performs said corresponding operation when said each of said one or more buttons is clicked.

29. The medium according to claim 25, wherein the program code when executed further causes:

changing said sequence of the plurality of data tuples by clicking at least one of the one or more buttons; and updating said list data.

30. The medium according to claim 29, wherein said updating comprises:

triggering a list data update unit in said plug-in;

determining a mode of updating, said mode of updating including a full update or a delta update;

downloading, if the mode of updating is a full update, the filler page from the server site, the downloaded filler page corresponding to a new timestamp and representing a full update;

rendering the full update;

generating, if the mode of updating is a delta update, by a delta update unit, a delta update query, based on a timestamp associated with said list data;

sending said delta update query to a delta update handler at said server site;

identifying, by said delta update handler, delta changes based on said timestamp specified in said delta update query;

generating a delta update based on said delta changes using a second new timestamp;

sending said delta update with said second new timestamp to said delta update unit;

rendering the delta update; and processing said new timestamp and said second new timestamp to replace said timestamp.

31. The medium of claim 29, wherein said changing of said sequence of the plurality of data tuples includes deleting at least one of said data tuples from said data list.

32. The medium of claim 29, wherein said changing of said sequence of the plurality of data tuples includes rearranging the order of said plurality of data tuples according to a characteristic of one of the plurality of attributes.

* * * * *